INVENTOR.
Heinrich Moelbert
BY
Parker & Brockman,
ATTORNEYS.

United States Patent Office 3,152,499
Patented Oct. 13, 1964

3,152,499
METHOD AND APPARATUS FOR SHEARING USING MOMENTARILY APPLIED SUPPORTING AND CLAMPING FORCES OF GREAT MAGNITUDE
Heinrich Moelbert, Buffalo, N.Y., assignor to Buffalo Forge Company, Buffalo, N.Y.
Filed Sept. 19, 1960, Ser. No. 57,039
12 Claims. (Cl. 83—51)

This invention relates to metal shearing machines of the type commonly referred to as billet shears or bar shears.

Machines of this type as heretofore constructed could not be relied upon to produce cuts in bars in which the cut surfaces approached closely to a plane perpendicular to the length of the work which was being cut. Said machines also could not eliminate all bending in the piece being sheared and therefore could not eliminate stress cracking or secondary fractures in critical steels where the stock is sheared cold.

It is consequently one of the objects of this invention to provide a machine which is capable of producing more accurate cuts in work and this also makes it possible to cut shorter pieces from bars and billets.

A further object is to provide a machine which is capable of gripping the bar with massive forces against both the stationary and movable shear knives, such that the action of the shear knives will displace the slug or work piece and at the same time hold both parts of the bar or work piece perfectly parallel against bending.

It is also an object of this invention to provide a machine in which the work which is being cut is securely held in the machine and in which a support is provided for holding the part of the work which is being cut off.

A further object is to provide a machine in which the holddown for the work is actuated simultaneously with the work support for the part of the work which is being cut off.

The frame of the machine may be of any suitable or desired construction, that shown having front and back plates or frame members 15 and 16 connected by side walls. The frame of the machine may rest upon a suitable base 17. The front and rear walls are also connected with upright frame members 20 and 21 and a transverse frame member 22. These frame members are suitably connected with each other and form supports for the working parts of the machine. The machine is also provided on the front wall with an opening 24 through which work to be cut may be passed and another opening 25 in the rear wall.

Figures 4, 5, 6:
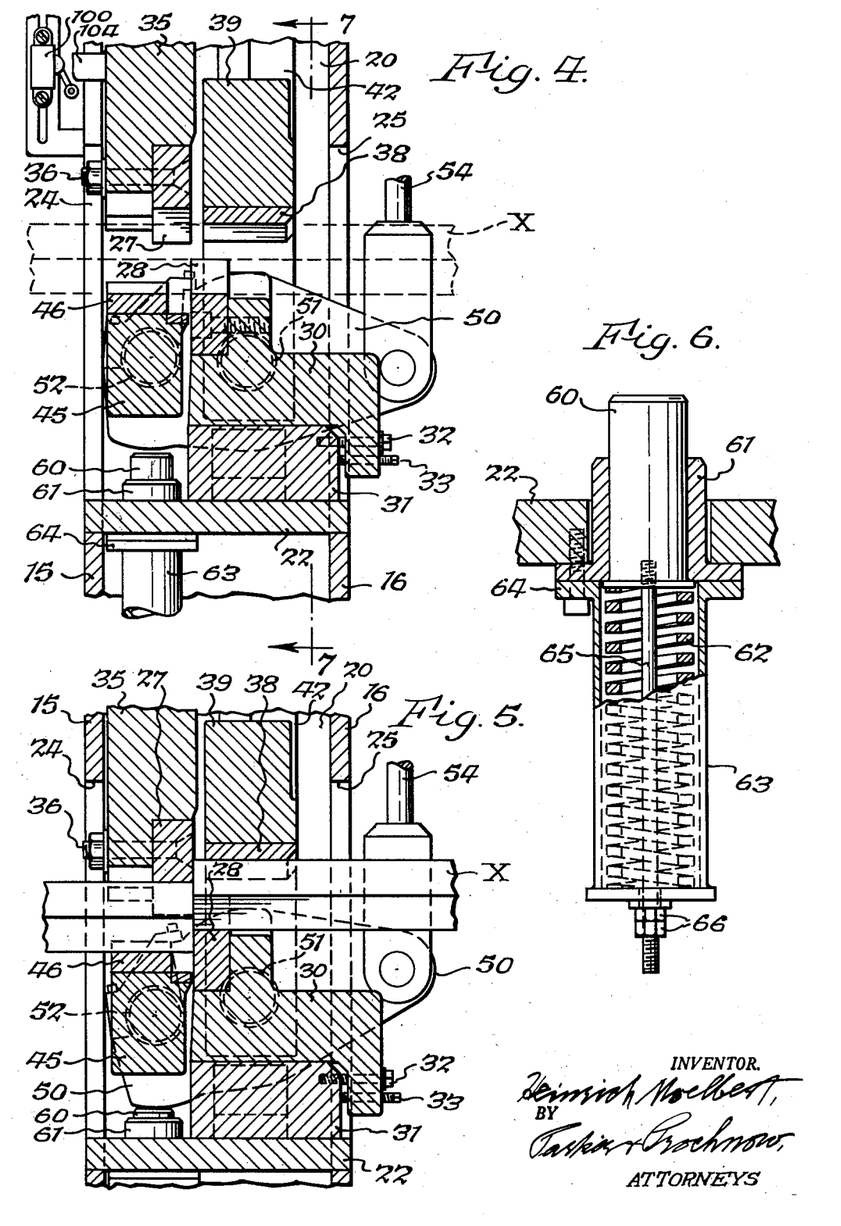
FIG. 4 is a fragmentary, transverse sectional elevation thereof on line 4—4, FIG. 1.
FIG. 5 is a similar sectional elevational showing the parts of the mechanism in different positions.
FIG. 6 is an elevation, partly in section, on a still larger scale showing a cushioning support for use in connection with a work support.

The machine shown by way of example in the drawings illustrates one embodiment of this invention in which the cutting is done by a downstroke of the movable knife or cutting member, but it will be understood that it is not intended to limit this invention to the particular construction illustrated in which 27 represents the upper or movable knife which cooperates with a stationary knife 28 which is removably mounted on a knife support 30, FIGS. 4 and 5, resting on a suitable block or support 31 mounted on the frame member 22. The knife holder 30 may be adjusted relatively to the block in any suitable manner, for example, by means of bolts 32 and 33 which cooperate with a downwardly extending flange of the knife holder 30. The stationary or lower knife may be removably mounted on the knife holder to be replaced by other knives for operating on work of different cross sectional shapes.

The upper knife 27 is mounted on a reciprocatory ram 35 which is guided in the frame of the machine for vertical movement and which may be reciprocated by means of the usual eccentric mechanism, not shown. Eccentrics of this kind for reciprocating the movable knives of shearing machines are well known and in common use and it is therefore unnecessary to show the eccentric, its connection with the ram, or the mechanism for rotating the same. The knife may be removably mounted on the ram 35 in any suitable manner, for example by means of bolts 36.

X represents the work which is being operated upon and which may of course vary greatly in size and cross section, that shown being merely illustrative of the operation of the machine. The work is inserted endwise through the opening 25 of the machine frame and rests upon the lower or stationary knife 28 and is held in this position by means of a hold-down or stripper 39 which includes a work-engaging piece 38 shaped to conform with the workpiece and removably secured to the hold-down member. This member guided for vertical movement in the frame of the machine is of yoke shape and is provided with a pair of downwardly extending, bifurcated legs 40. The outer portions of these legs are guided for vertical motion in guide members or bearings 41 and 42 suitably secured on the frame members 15, 16, 20 and 21. These legs are at opposite sides of the workpiece.

Figure 3:
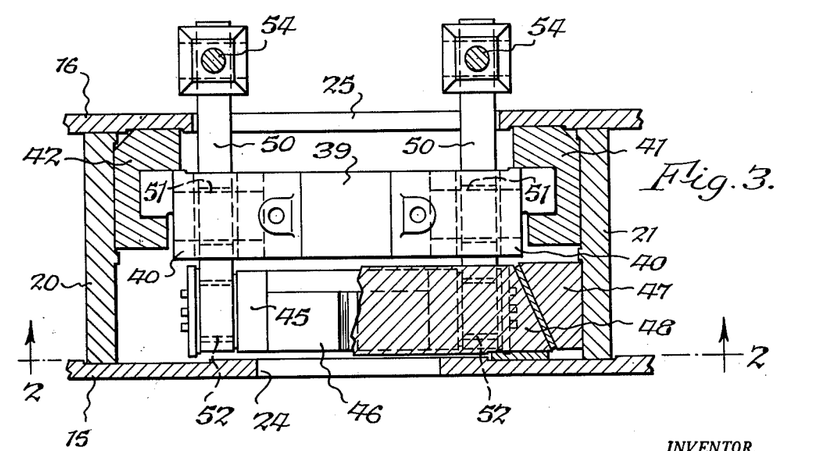
FIG. 3 is a sectional plan view thereof taken approximately on line 3—3, FIG. 2.

I have found it very desirable to provide a yielding support for the part of the workpiece which is being cut off and for that purpose I have provided a work support 45 which has the upper portion provided with a removable contact piece 46 shaped according to the shape of the lower face of the workpiece. This work support is movable upwardly into position to support the part of the workpiece while being cut off and to move downwardly when the upper knife moves the cutoff piece downwardly, the work support being directly below the upper knife. Any suitable guide means may be employed for guiding the knife and its ram during its up and down movement, such as guide bearings 47 and 48, FIG. 3.

Figure 1:
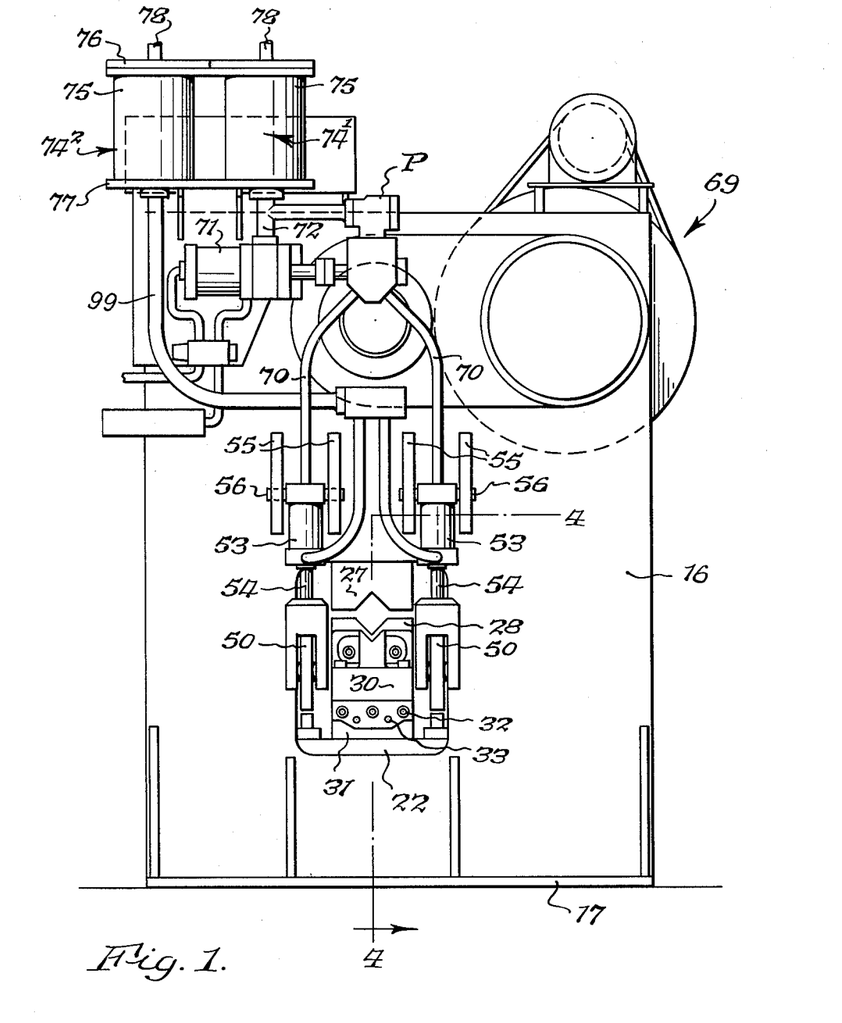
FIG. 1 is a rear elevation of a machine embodying this invention.
Figure 2:
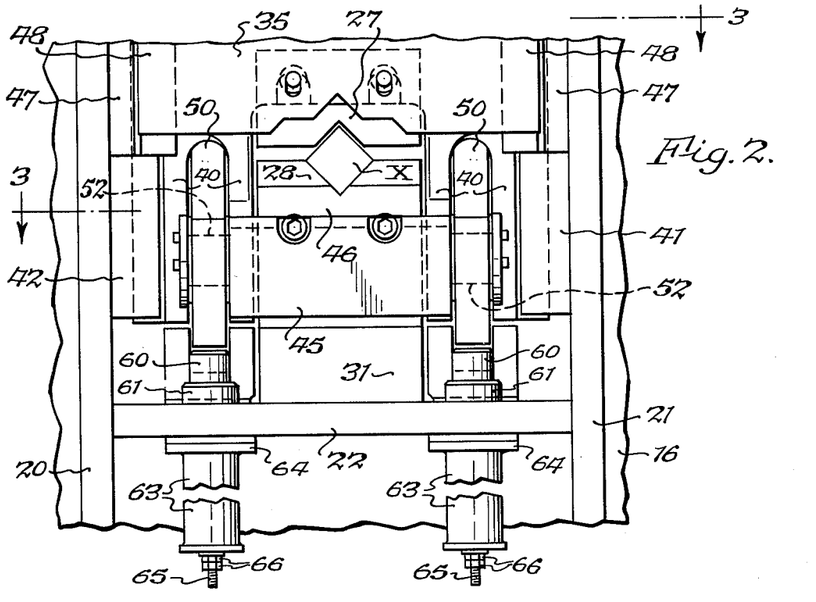
FIG. 2 is a fragmentary, sectional elevation thereof on an enlarged scale taken approximately on line 2—2, FIG. 3.
Figure 7:
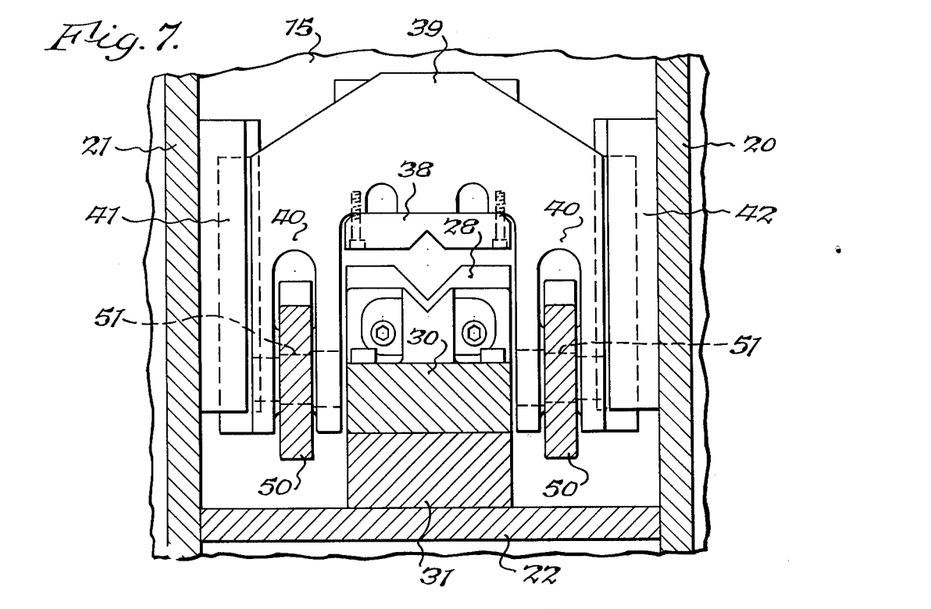
FIG. 7 is a sectional elevation thereof on line 7—7, FIG. 4.

Any suitable means may be provided for imparting movement to the work support 45 and the hold-down 39. In the construction shown for this purpose, I have provided a pair of levers 50 arranged at opposite sides of the path of movement of the work. These levers extend through the bifurcated legs of the hold-down, as clearly shown in FIGS. 2, 3 and 7, and are pivoted to the legs by means of suitable pivot pins or bearings 51. These levers extend toward the rear of the machine and have their rear ends pivotally connected with trunnions or bearings 52 secured to and extending laterally from opposite sides of the work support 45. The other ends of these levers extend forwardly through the front wall of the machine and are connected with suitable power operated means for swinging the levers. In the construction shown for this purpose, these power operated means comprise hydraulic cylinders 53 suitably mounted on the front wall of the machine and having piston rods 54 connected by means of threads and clevices with the front ends of the levers 50, see particularly FIG. 1. The cylinders 53 are preferably pivoted on suitable brackets 55 secured to the front wall 16 of the machine by means of trunnions 56 secured to and extending outwardly from the hydraulic cylinders, so that the cylinders can swing about these trunnions to compensate for the radial component of movement of the levers 50 when swinging about their pivots.

In the operation of the mechanism described, if a workpiece is in position and about to be cut, the front ends of the levers are first swung downwardly by means of the power actuated mechanism, which results in moving the hold-down 39 into clamping engagement with the work piece. After work hold-down 39 engages the bar stock X, levers 50 are pivoted about pins 51 and the work support 45 is swung upwardly in close proximity of the stationary knife 28 and into engagement with the portion of the workpiece about to be cut. As the movable knife 27 cuts the work, the portion thereof beyond the cut is securely supported by the work support 45, and after the cut has been completed, further downward movement of the knife 27 will force the cutoff portion of the work downwardly with the work support 45, which results in downward movement of the work support, and this in turn causes the lever 50 to swing about its pivotal connection 51 with the hold-down, thus forcing the pistons of the cylinders 53 upwardly while the hold-down holds the main portion of the workpiece downwardly and prevents movement of the same until the upper or movable knife 27 has reached its lowest position, whereupon the fluid pressure to the cylinders 53 of the power mechanism is reversed and moves the hold-down upwardly to release the work. It can thus be seen that during the initial actuation of cylinders 53 which causes rods 54 to move downwardly there is a clockwise pivotal movement of levers 50 (FIG. 4) about bearings 52 while the left ends of levers are supported on contact buffers 60 until work hold-down 39 engages rod X. Thereafter, continued downward movement of rods 54 causes levers 50 to pivot in a clockwise direction in FIG. 4 about pivotal connections 51 until work support 46 engages the workpiece. Two features are inherent in the foregoing operation. Firstly, hold-down 39 initially engages rod X with a relatively light force until work support 46 engages the workpiece. Secondly, because of the above-described pivotal action of lever 50, the work support 46 always comes into engagement with the workpiece, even though the cross sectional dimenisons of the rod X may vary along the length thereof.

In order to control the position of the work support 45 and the work engaging piece 46 while material is being fed to the knives prior to the actual shearing operation, and to prevent the possibility of a sheared piece remaining in the machine, I have provided supporting cushions or buffers 60 and preloaded springs 62 mounted on the transverse frame member 22. These cushioning members in the construction shown each include a contact buffer 60 mounted in a flanged guide 61. Downward movement of the buffer contact 60 is opposed by the spring 62 arranged in cylindrical housing 63 which also has an outwardly extending, annular flange 64, which together with the guide 61 is bolted to the under surface of the transverse frame member 22. A central rod 65 preferably extends through the cylinder 63 and is secured to buffer 60 for drawing the buffer downwardly and preloading the spring 62 during assembly operations. Position of work support 45 and work engaging piece 46 is controlled by the lower round collar on buffer 60 in contact with flanged guide 61.

As shown in FIGS. 4 and 5, these cushioning members are mounted so as to be engaged by a portion of the lever 50 when the same is swung downwardly from the position shown in FIG. 4 to that shown in FIG. 5. Any other means for resiliently holding or positioning the work support 45 and allowing movement, due to downward movement of the upper knife 27 may be employed.

Figure 8:
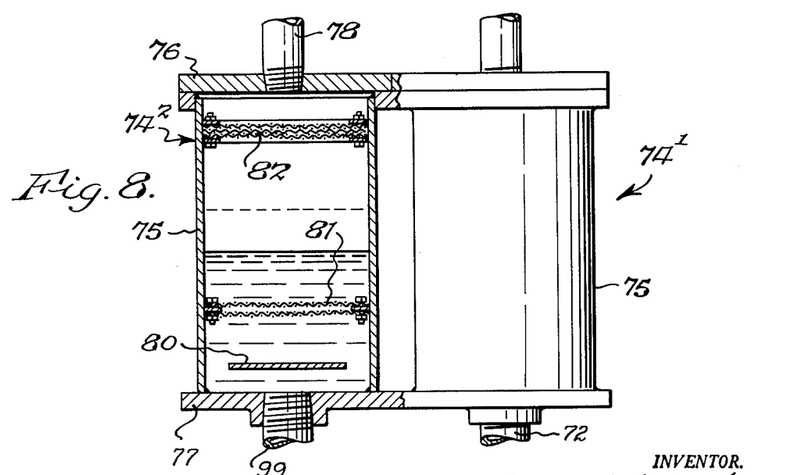
FIG. 8 is an elevation, partly in section, of a reservoir for hydraulic fluid used in connection with the operation of the machine.

After actuation of ram 35 to cause downward movement of movable knife 27, the latter engages the workpiece, and both the workpiece and movable support 45 tend to move downwardly, thereby causing levers 50 to pivot in a counterclockwise direction both about pins 51 and the pivotal connections between levers 50 and rods 54 from the position shown in FIG. 4 to the position shown in FIG. 5. As a result of the work support 45 being moved downwardly by the movable knife and the ram 35, which causes the lever 50 to be swung in the reverse direction, as noted above, the pistons in the cylinders 53 are moved upwardly against the pressure in the cylinders, thus forcing the oil or other pressure fluid to move upwardly in the pipes 70 which lead from the cylinders 53 through which pressure fluid is initially supplied to the cylinders. These pipes lead to a booster 71 which normally serves to increase the pressure of the fluid for supplying the pistons 53 with fluid at higher pressure after their initial movement by fluid at normal pressure. This causes a massive force to be exerted by the work hold-down 39 on rod X and also causes a massive force to be exerted on the workpiece by work support 45 during the actual shearing operation. These massive forces maintain the axes of the workpiece and the rod X substantially parallel during the shearing operation thereby causing the shearing to occur along a plane which is substantially parallel to the longitudinal axes of both the rod X and the workpiece because the tendency of the workpiece to bend relative to rod X is obviated. Furthermore, the massive forces which are applied only during the actual shearing operation tend to stress both the workpiece and rod X to thereby eliminate stress cracking and secondary fractures. After the foregoing action, the excess oil or other fluid is conducted from the booster through a pipe 72 to a separator 74', FIGS. 1, 8 and 9, as will be herein more fully explained, in which the oil is held separate from the air. Two of these separators 74' and $74^2$ are shown and each comprises an outer housing 75 preferably of cylindrical form having upper and lower end walls 76 and 77, the lower end wall 77 being provided with openings for the pipes 72 and 99 and the upper walls being provided with pipes 78.

In order to prevent air from becoming entrained in the oil or foaming, a baffle 80 is provided in each tank 75 and a screen 81 to break up or deflect the jet of oil from pipes 72 and 99. Further to prevent atomizing of the air and oil due to the air blast contacting the top of the oil in tank 75, screens on either side of a dense pad of knitted wire mesh 82 and a small air baffle for direct air blast deflection are provided at the top of each tank. Other means for effecting separation of the air from the oil may be provided, if desired, to insure that the air passing through to the upper surface of the screen is comparatively free from liquid.

Figures 9, 10:
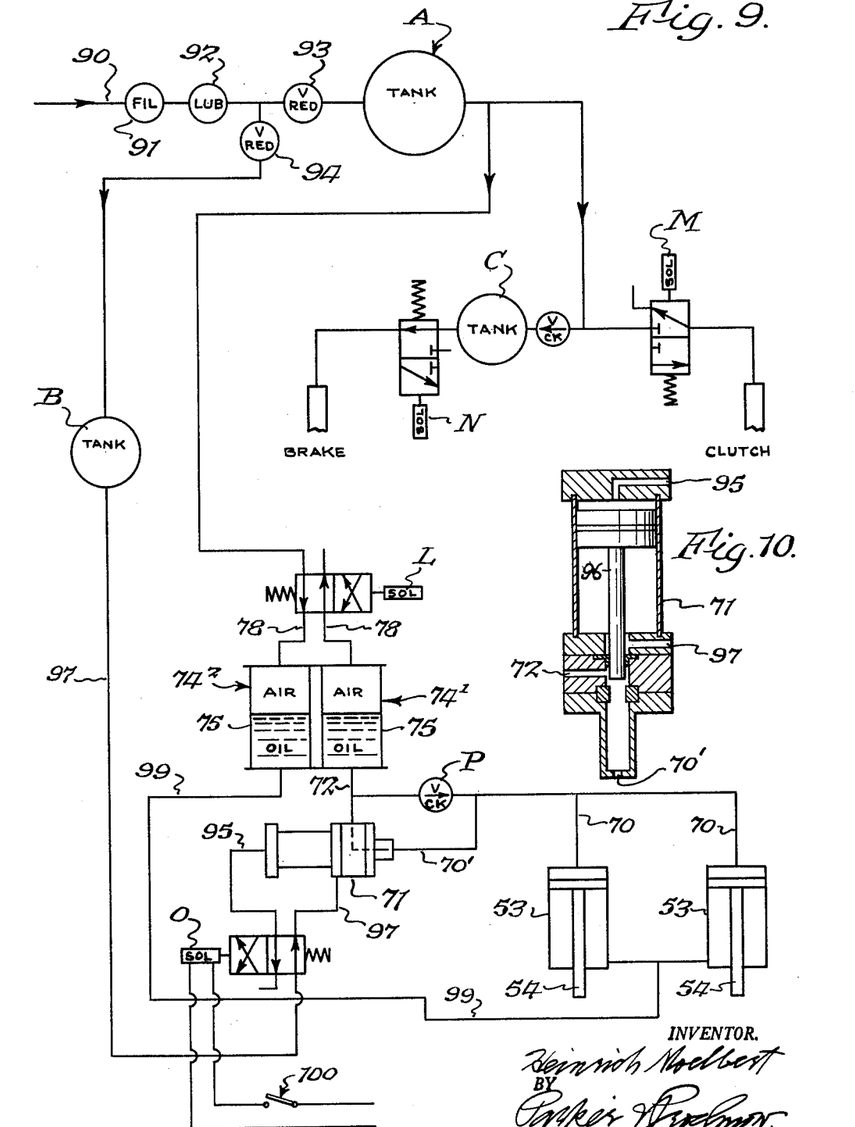
FIG. 9 is a diagrammatic view of the hydraulic control mechanism for the machine.
FIG. 10 is a vertical central section of a booster such as may be used in connection with the operation of the machine.

FIG. 9 shows diagrammatically the various actuating connections with parts of the machine to effect operation of the same, but it will be understood that other systems of operating the machine may be employed. In the construction shown compressed air is admitted through conduit 90 and passes through a filter 91 and a lubricating device 92. The air then passes through a pair of reducing valves 93 and 94, the valve 94 being in a branch pipe and the valve 93 being in a pipe leading to the supply tank, A. The conduit connected with the reducing valve 94 leads to a booster tank B. There is also provided an emergency tank C containing air for actuating the brake which prevents operation of the machine unless released. At the beginning of the operation of the machine the brake solenoid N is actuated which controls a valve for supplying compressed air to release the brake and another solenoid M is actuated which controls a valve to supply air to a clutch which connects the machine with its drive 69. All of the parts thus far described have heretofore been used in connection with operation of presses and shears, and it is therefore not deemed necessary to describe or illustrate these parts in detail.

At the same time that the solenoid N is actuated to release the brake, a solenoid L opens a valve to admit air under pressure to the tank 74' above the oil therein and thus to force oil through a check valve P to the cylinders 53, which actuate the hold down levers 50, and also to the booster 71. The booster is of the usual type in which a large volume of air at relatively low pressure from a pipe 95 acts on a small volume of oil to greatly increase the total force of the same. The booster may for example be as shown in FIG. 10 to which compressed air is admitted from the pipe 95 to actuate a piston having a plunger or piston rod 96 which enters a small cylinder to which oil is admitted through pipe 72. The oil under pressure then passes through branch pipe 70' to pipe 70 leading to the cylinders 53. The air piston is returned by air pressure from a pipe 97.

The reverse movement of the levers 50 which occurs at the time the work support 45 is depressed by the movable knife 27 has the further advantage of exerting heavy down pressure on the hold-down 39, thus clamping the work securely at the time the movable knife is penetrating the workpiece. Due to the construction of the machine and method of actuating the booster, the amount of pressure exerted on the workpiece by the hold-down 39 and work support 45 is controlled closely by the regulator 94. Also quick release of the workpiece is accomplished by actuating solenoid O at the instant the cut is completed. In this manner the workpiece is released at the bottom of the stroke and as soon as the knife moves clear of the work in the upward direction the bar is free to move in for additional cuts.

After a brief interval of time during the turning of the crank shaft which actuates the ram 35, the booster solenoid O is energized to cause the booster piston to move into a high pressure position. By that time the cylinders 53 have been subjected to lower pressure oil and thus levers 50 have moved hold-down 39 and work support 45 into contact with the bar, whereupon the high pressure from the booster is supplied to these cylinders to exert greater pressure on the levers 50. In other words, after the work hold-down 39 and work support 45 have engaged the rod X and workpiece, respectively, the solenoid O is actuated incidental to movement of the ram 35 which carries knife 27 to cause compressed air to enter conduit 95 (FIGS. 9 and 10) to cause piston 96 (FIG. 10) in booster 71 to increase the hydraulic pressure in conduit 70' leading to conduits 70, thereby providing the massive forces during the shearing operation. The foregoing can be more readily visualized when it is considered that work support 45 tends to move downwardly in FIG. 4 as the knife 27 exerts a downward pressure on the workpiece during the initial penetration thereof. However, at this time the booster is already operative to tend to prevent counterclockwise rotation of levers 50 about pivots 51 because cylinders 53 and their associated pistons exert a greater force tending to prevent said counterclockwise rotation than they exerted in effecting their initial clockwise rotation. Therefore, since counterclockwise rotation of levers 50 about pivots 51 is impeded by increased hydraulic pressure in cylinders 53, hold-down 39 tends to move downwardly into engagement with bar X with a greater force as work support 45 is moved downwardly during penetration of bar X by knife 27. In other words there is a compound action during knife penetration, namely, a pivotal movement of levers 50 about the pivots connecting it to rods 54 and also a pivotal movement about pivots 51. It is the action of the booster in impeding counterclockwise movement of levers 50 in FIG. 4 which results in the exertion of the above-mentioned massive forces on both bar X and the workpiece during the penetration by movable knife 27. After the upper knife cuts through rod X a sufficient amount to effect shearing of the workpiece from rod X and pushes down the work support 45, the levers 50 swing in reverse direction and cause oil in the pistons 53 to be discharged from these pistons back to the booster at high pressure through branch pipe 70', thus pushing the air piston back against the air pressure acting thereon. This results in forcing oil back through pipe 72 into the tank 74', as shown in FIG. 10.

The foregoing swinging of levers 50 in a reverse direction after shearing is effected occurs because solenoids L and O are deenergized to bring the valves controlled thereby back into normal positions after shearing has been completed. When the valves are in these positions oil under pressure from a tank $74^2$ will pass to the lower parts of the cylinders 53 through a pipe 99, thus causing the pistons therein to move upwardly and the levers 50 to swing into starting positions shown in FIG. 4. After further operation of the cycle of the machine, the solenoid M is actuated to release the clutch and the solenoid N is actuated to apply the brake, thus completing the cycle of operation of the machine.

Since the sheared bar does not break out on a straight plane, and since both the incoming bar and the part cut therefrom are held with massive forces which do not allow them to move apart, it is very desirable to release the cut off part immediately when the cut is completed, even though the knife continues to move downwardly after the completion of the cut. If this holding force is not released as soon as the cut is completed, the movement of the cut off part down across the face of the incoming bar scores both the face of the cut off part and the end of the bar which has been sheared. The extent of knife penetration into the work prior to the breakage depends primarily upon the hardness of the bar which is being cut. For example a bar 4" square in cross section of mild steel may require approximately 1" of penetration to effect breakage or separation of the piece which is being cut from the bar. A bar of similar size but of steel with the hardness of approximately Rockwell C–30–40 will break after the material has been penetrated approximately ⅛". Since it is desirable to release the hold down and work support as soon as the breakage or separation has occurred, I have provided an adjustable limit switch which is located on the frame of the machine and which is adjustable to be actuated when the knife has penetrated the work sufficiently to sever the same. In the construction shown for this purpose in FIG. 4, I have provided a limit switch 100 which is adjustably mounted on a stationary part of the machine and which cooperates with a switch actuating finger 104 projecting outwardly from the ram 35. Since adjustable limit switches are old and well known, this switch has not been shown in detail. This switch, which is also indicated diagrammatically in FIG. 9, controls a circuit connected with the solenoid O in such a manner that when the switch is actuated, the solenoid will change the position of the piston of the booster 71 to discharge fluid from the cylinders 53, so that the cut off part of the bar may slide away from the main body of the bar sufficiently to avoid damage to either of these parts.

It will be understood that various changes in the details, materials and arrangements of parts, which have been herein described and illustrated in order to explain the nature of the invention, may be made by those skilled in

I claim:

1. A method of shearing a workpiece from an elongated metallic member by means of first and second knives which are relatively movable toward each other comprising the steps of causing said first and second knives to partially penetrate said member for a sufficient distance from opposite directions to effect shearing of said member and causing said knives to continue their relative movement toward each other after said shearing has been effected, simultaneously supporting said member and workpiece with sufficient forces to maintain the longitudinal axis of said workpiece substantially parallel to the longitudinal axis of said member during the partial penetration of said member by said knives, and relieving at least one of said forces immediately after said sufficient partial penetration has been effected to produce said shearing to thereby permit relative axial movement between said workpiece and the remainder of said member from which said workpiece was sheared to thereby prevent the scoring of adjacent sheared faces of said workpiece and said member incidental to relative radial movement therebetween as a result of said continued relative movement of said knives toward each other after said shearing has been effected.

2. A method of shearing a workpiece from the end of an elongated metallic member comprising the steps of locating said member with respect to first and second knives which are relatively movable in opposite directions toward each other, clamping said member with a first force, supporting said workpiece with a second force, causing relative movement between said first and second knives to thereby cause said first and second knives to approach each other, simultaneously effecting partial penetration of said elongated member with said first and second knives from opposite sides of elongated member, said partial penetrations being of a magnitude which will cause said member to be sheared between the areas of said partial penetrations, momentarily increasing said first and second forces to a relatively high value during said partial penetration of said member by both of said knives to thereby exert massive forces on both said member and on said workpiece during the penetration of said member by said knives, maintaining said massive forces on both said workpiece and said member only during said partial penetration of said knives, and causing said massive forces to be of a sufficient magnitude to maintain the longitudinal axis of said workpiece substantially parallel to the longitudinal axis of said member during said penetration of said knives to thereby prevent the bending of said workpiece relative to the remainder of said member during said shearing, whereby said workpiece is sheared from said member along a plane which is substantially perpendicular to said longitudinal axes and whereby the tendencies for stress cracking and secondary fractures in both said workpiece and said member are obviated.

3. A method of shearing a workpiece from the end of an elongated metallic member by means of first and second knives which are relatively movable toward each other comprising the steps of clamping said member relative to said first knife with a first force, supporting said workpiece at the end of said member with a second force, causing relative movement between said first and second knives to thereby cause said first and second knives to approach each other, simultaneously effecting partial penetration of said elongated metallic member with said first and second knives from opposite slides of said elongated member, momentarily increasing said first and second forces while both of said knives are penetrating said member to thereby cause massive forces to be exerted on both said member and said workpiece during the shearing of said member, said massive forces being of a magnitude to minimize the tendency for stress cracking and secondary fractures in both said workpiece and said member during said shearing, and terminating said momentary application of massive forces on both said member and said workpiece after said partial penetrations have been effected and the central portion of said member between said penetrations has been sheared as a result of such partial penetrations, said momentary application of said massive forces also preventing excessive distortion of both said member and said workpiece which would otherwise result from the exertion of said massive forces thereon for a prolonged period of time.

4. A method of shearing a workpiece from the end of an elongated metallic member by means of first and second knives which are relatively movable toward each other comprising the steps of clamping said member relative to said first knife with a first force, supporting said workpiece at the end of said member with a second force, causing relative movement between said first and second knives to thereby cause said first and second knives to approach each other and penetrate said member from opposite sides thereof, momentarily increasing said first and second forces while both of said knives are penetrating said member to thereby cause massive forces to be exerted on both said member and said workpiece during the penetration of said member by said knives to thereby obviate the tendency for stress cracking and secondary fractures in both said workpiece and said member during said shearing, said massive forces being of a magnitude to maintain the longitudinal axes of said workpiece and said member substantially parallel during said partial penetration, and terminating said momentary application of massive forces on both said member and said workpiece after sufficient penetration of said member has been effected to produce shearing while permitting said first and second knives to continue to approach each other after said shearing has been effected, said relieving of said massive forces permitting said workpiece to move in the direction of its longitudinal axis relative to said member while said first and second knives continue to approach each other to thereby prevent scoring of the areas on both said member and said workpiece along which said shearing was effected in the event said areas tend to engage each other after said shearing has been effected.

5. A method of shearing a workpiece from an elongated metallic member comprising the steps of locating said member with respect to a pair of knives which are relatively movable toward each other, clamping said member with a clamping force proximate one of said knives, supporting said workpiece with a supporting force proximate the other of said knives, effecting partial penetration of opposite sides of said member by said relatively movable knives for a sufficient distance to effect shearing of said member, converting said clamping force and said supporting force to massive forces incidental only to the penetration of said member by said knives to thereby obviate the tendency for premature exertion of said massive forces on said member and on said workpiece prior to the penetration of said member by said knives, said massive forces being of at least a magnitude to maintain the longitudinal axes of said workpiece and said member substantially parallel during said penetration, and terminating the application of said massive forces on said member and on said workpiece immediately after sufficient penetration of said knives has been effected to effect shearing of said workpiece from said member to thereby obviate the tendency for prolonged exertion of said massive forces on said workpiece and on said member, said exertion of said massive forces on said workpiece and on said member during the penetration by said knives obviating the tendency for stress cracking and secondary fractures in both said workpiece and said member from which said workpiece is sheared.

6. A method of shearing a workpiece from an elongated metallic member comprising the steps of locating said member with respect to a pair of knives which are relatively movable toward each other, clamping said member with a first force relative to one of said knives, supporting said workpiece with a second force, effecting partial penetration of said member from opposite sides thereof by said relatively movable knives from a sufficient distance to cause said workpiece to be severed from said member by causing the portion of said member between the areas of penetration to fracture, converting said second force to a massive force incidental only to the partial penetration of said member by said knives to thereby obviate the tendency for premature exertion of said massive force on said workpiece prior to the penetration of said member by said knives, said massive force being of at least a magnitude to maintain the longitudinal axis of said workpiece always extending in substantially the same direction during the shearing thereof from said member, and terminating the application of said massive force on said workpiece immediately after sufficient penetration of said knives has been effected to cause said shearing of said workpiece from said member to thereby obviate the tendency for prolonged exertion of said massive force on said workpiece, said momentary exertion of said massive force on said workpiece only during the penetration of said billet by said knives obviating the tendency for stress cracking and secondary fractures in said workpiece.

7. A machine for shearing a workpiece from an elongated metallic member comprising a frame, a first knife mounted on said frame, hold-down means mounted in opposition to said first knife, a second knife on said frame, a workpiece support mounted in opposition to said second knife, means for moving said hold-down means into engagement with said member, means for moving said workpiece support into engagement with said workpiece, means for causing relative movement of said knives toward each other to effect a partial penetration of said knives into said member for a sufficient amount to effect a shearing of said workpiece from said member by causing cleavage of the portion of said member between the penetrated areas, means for causing massive forces to be applied to both said workpiece and said member by said workpiece support and said hold-down means, respectively, during said partial penetration to thereby eliminate stress cracking and secondary fractures in both said workpiece and said member during said shearing, said massive forces being of a magnitude which is at least sufficient to maintain the longitudinal axes of said workpiece and member substantially parallel during said partial penetration, and means for relieving at least one of said massive forces immediately after said sufficient amount of partial penetration has been effected to produce said shearing.

8. A shearing machine for shearing a workpiece from an elongated metallic member comprising a pair of knives, hold-down means, means for moving said hold-down means into engagement with said member to thereby secure said member with a first force, workpiece support means, means for moving said workpiece support means into engagement with said workpiece irrespective of dimensional variations in said workpiece and for supporting said workpiece with a second force, said first and second forces being of a magnitude which is incapable of bending said member, means for causing said knives to move relative toward each other to partially penetrate said member for a sufficient distance to effect shearing thereof and to thereafter continue their relative movement toward each other, means responsive to the penetration of said member by said knives for causing said hold-down means and said workpiece support means to exert massive forces on said member and said workpiece, respectively, during said partial penetration of said knives, said massive forces being of a magnitude to maintain the longitudinal axes of said workpiece and said member substantially parallel during said partial penetration, and means for relieving at least one of said massive forces immediately after said workpiece has been sheared from said member, said relieving of at least one of said massive forces after penetration permitting relative axial movement between said workpiece and said member in the event that the sheared surfaces of said workpiece and said member tend to contact each other during relative radial movement between said workpiece and said member as said knives continue moving relative toward each other thereby obviating the possibility of the scoring of said sheared surfaces by each other.

9. A machine for shearing a workpiece from an elongated metallic member comprising a frame, a first knife mounted on said frame, hold-down means mounted in opposition to said first knife, a second knife on said frame, a workpiece support mounted in opposition to said second knife, means for moving said hold-down means into engagement with said member, means for moving said workpiece support into engagement with said workpiece, knife moving means for causing relative movement between said knives toward each other to effect a sufficient partial penetration of said member to effect a shearing of said workpiece from said member, said knife moving means causing said relative movement of said knives toward each other to continue after said shearing has been effected, means for causing sufficient forces to be provided by said workpiece support and said hold-down means to maintain the longitudinal axis of said workpiece substantially parallel to the longitudinal axis of said member during said penetration, and means for relieving at least one of said forces immediately after sufficient penetration of said knives has been effected to cause shearing to thereby permit relative axial movement between said workpiece and the remainder of said member from which said workpiece was sheared to thereby prevent the scoring of adjacent sheared faces of said workpiece and said member incidental to relative radial movement therebetween as a result of the continued action of said knife moving means in causing relative movement of said knives toward each other after said shearing has been effected.

10. A machine for shearing a workpiece from an elongated metallic member comprising a frame, a first knife mounted on said frame, hold-down means mounted in opposition to said first knife, a second knife on said frame, a workpiece support mounted in opposition to said second knife, means for moving said hold-down means into engagement with said member, means for moving said workpiece support into engagement with said workpiece, means for causing relative movement of said knives toward each other to effect a partial penetration of said knives into said member for a sufficient amount to effect a shearing of said workpiece from said member by causing cleavage of the portion of said member between the penetrated areas, means for causing massive forces to be applied to both said workpiece and said member by said workpiece support and said hold-down means, respectively, during said partial penetration to thereby eliminate stress cracking and secondary fractures in both said workpiece and said member during said shearing, said massive forces being of a magnitude which is at least sufficient to maintain the longitudinal axes of said workpiece and said member substantially parallel during said partial penetration, said means for moving said workpiece support into engagement with said workpiece including means which automatically compensate for variations in cross sectional dimensions of said workpiece to thereby provide a firm support thereto irrespective of variations in said cross sectional dimensions and thereby prevent bending of said workpiece relative to said member during said shearing, and means for relieving at least one of said massive forces after said shearing has been effected to thereby permit relative axial movement between said workpiece and said member to thereby prevent scoring of the sheared portions of said workpiece and said member as a result of said sheared portions contacting each other incidental to the continued movement of said knives toward each other after said shearing has been effected.

11. A machine for shearing a workpiece from an elongated metallic member comprising a frame, a first knife mounted on said frame, hold-down means mounted in opposition to said first knife, a second knife on said frame, a workpiece support mounted in opposition to said second knife, means for moving said hold-down means into engagement with said member, means for moving said workpiece support into engagement with said workpiece, means for causing relative movement of said knives toward each other to effect a partial penetration of said knives into said member for a sufficient amount to effect a shearing of said workpiece from said member by causing cleavage of the portion of said member between the penetrated areas, means for causing massive forces to be applied to both said workpiece and said member by said workpiece support and said hold-down means, respectively, during said partial penetration to thereby eliminate stress cracking and secondary fractures in both said workpiece and said member during said shearing, said massive forces being of a magnitude which is at least sufficient to maintain the longitudinal axes of said workpiece and member substantially parallel during said partial penetration, said means for moving said hold-down means into engagement with said member and for moving said workpiece support into engagement with said workpiece comprising an hydraulic motor mounted on said frame, a lever, means for coupling the output of said hydraulic motor to one end of said lever, means for pivotally coupling said hold-down to a central portion of said lever, and means for mounting said workpiece support on the opposite end of said lever from said means for coupling said hydraulic motor to said lever, the actuation of said hydraulic motor causing said hold-down means to initially engage said member and thereafter causing said workpiece support to engage said workpiece after said engagement between said hold-down means and said member, said sequential engagement by said hold-down means and said workpiece support causing said workpiece support to continue its travel until it engages said workpiece irrespective of variations in cross sectional dimension of said workpiece, whereby said workpiece is always supported irrespective of the dimensional variations thereof.

12. A machine for shearing a workpiece from an elongated metallic member comprising a frame, a first knife mounted on said frame, hold-down means mounted in opposition to said first knife, a second knife on said frame, a workpiece support mounted in opposition to said second knife, means for moving said hold-down means into engagement with said member, means for moving said workpiece support into engagement with said workpiece, means for causing relative movement of said knives toward each other to effect a partial penetration of said knives into said member for a sufficient amount to effect a shearing of said workpiece from said member by causing cleavage of the portion of said member between the penetrated areas, means for causing massive forces to be applied to both said workpiece and said member by said workpiece support and said hold-down means, respectively, during said partial penetration to thereby eliminate stress cracking and secondary fractures in both said workpiece and said member during said shearing, said massive forces being of a magnitude which is at least sufficient to maintain the longitudinal axes of said workpiece and member substantially parallel during said partial penetration, and means for instantaneously relieving said massive force on said workpiece immediately after said shearing has been terminated to thereby cause said exertion of said massive forces for only a momentary period to thereby both obviate the tendency for distortion of said workpiece due to prolonged exertion of said massive forces and also permit said workpiece to move axially relative to the portion of the member from which it was sheared thereby obviating the tendency for scoring of the sheared surfaces in the event that said sheared surfaces tend to contact each other as a result of relative radial movement therebetween.

References Cited in the file of this patent

UNITED STATES PATENTS

| | | |
|---|---|---|
| 260,178 | Durfee | June 27, 1882 |
| 1,007,349 | Gerdau | Oct. 31, 1911 |
| 1,531,403 | Koerner | Mar. 31, 1925 |
| 2,132,136 | Tucker | Oct. 4, 1938 |
| 2,302,115 | Gazey | Nov. 17, 1942 |
| 2,506,651 | Seybold | May 9, 1950 |
| 2,820,518 | Shumaker | Jan. 21, 1958 |
| 2,986,057 | Novak | May 30, 1961 |
| 3,084,580 | Schmid | Apr. 9, 1963 |